(12) United States Patent
Shirwadkar et al.

(10) Patent No.: US 12,705,292 B2
(45) Date of Patent: Aug. 11, 2026

(54) USER PROFILE FILTERING BASED UPON SENSITIVE TOPICS

(71) Applicant: Yahoo Assets LLC, New York, NY (US)

(72) Inventors: Sanika Shirwadkar, Milpitas, CA (US); Nils P Schimmelmann, Mountain View, CA (US); Jeffrey T Wilson, Ashburn, VA (US); Chun-Yi Tu, San Jose, CA (US)

(73) Assignee: Yahoo Assets LLC, New York, NY (US)

( * ) Notice: Subject to any disclaimer, the term of this patent is extended or adjusted under 35 U.S.C. 154(b) by 0 days.

(21) Appl. No.: 18/216,624

(22) Filed: Jun. 30, 2023

(65) Prior Publication Data

US 2025/0005085 A1 Jan. 2, 2025

(51) Int. Cl.

*G06F 16/95* (2019.01)
*G06F 16/906* (2019.01)
*G06F 16/9535* (2019.01)
*G06F 16/9538* (2019.01)

(52) U.S. Cl.

CPC ........ *G06F 16/9535* (2019.01); *G06F 16/906* (2019.01); *G06F 16/9538* (2019.01)

(58) Field of Classification Search

CPC . G06F 16/9535; G06F 16/906; G06F 16/9538
See application file for complete search history.

(56) References Cited

U.S. PATENT DOCUMENTS 9,442,467 B1 * 9/2016 Behbehani ............. G06Q 10/10
11,574,145 B2 * 2/2023 Narlikar ................ G06F 18/213
11,869,015 B1 * 1/2024 Fradkin .............. G06Q 30/0631
2007/0280112 A1 * 12/2007 Zheng ..................... H04L 12/66 370/235
2012/0203684 A1 * 8/2012 Gilbert ................... G06Q 40/04 705/37
2013/0031074 A1 * 1/2013 Vartanian ............ G06F 16/9535 707/706
2015/0100407 A1 * 4/2015 Sterns ................ G06Q 30/0251 705/14.41
2015/0178282 A1 * 6/2015 Gorur ................ G06F 16/9535 707/748
2015/0287146 A1 * 10/2015 El Daher ............... G06Q 30/00 705/319
2017/0316380 A1 * 11/2017 Swaminathan ...... G06Q 10/105
2018/0173685 A1 * 6/2018 Christodorescu ..... G06F 21/577
2018/0189289 A1 * 7/2018 Wexler ................ G06F 16/9535
(Continued)

*Primary Examiner* — Mohammad S Rostami
(74) *Attorney, Agent, or Firm* — Cooper Legal Group LLC

(57) ABSTRACT

One or more systems and/or methods for filtering user profiles based upon sensitive topics are provided. A set of candidate topics labeled with sensitivity labels corresponding to whether candidate topics are sensitive topics or non-sensitive topics are generated. The sensitivity labels are applied to an unknown entity space of entities to label the entities with the sensitivity labels to create a set of labeled topics labeled as either the sensitive topics or the non-sensitive topics. The set of labeled topics and metadata for the set of labeled topics are stored within a central sensitivity data store. The set of labeled topics and metadata within the central sensitivity data store are used to filter sensitive topics from user profiles of users.

20 Claims, 9 Drawing Sheets

(56) References Cited

U.S. PATENT DOCUMENTS

2019/0034295 A1* 1/2019 Bourgeois ............. G06F 16/125
2019/0102574 A1* 4/2019 Roberts .................... G06N 5/01
2019/0213354 A1* 7/2019 Bhowan ................. G06N 20/00
2019/0268379 A1* 8/2019 Narayanaswamy .... H04L 63/12
2019/0391898 A1* 12/2019 Vichare ............... G06F 9/44505
2020/0192947 A1* 6/2020 Messenger .......... G06F 16/9538
2020/0250323 A1* 8/2020 Remington ......... G06F 21/6281
2020/0372172 A1* 11/2020 Murray ............... G06F 16/9024
2021/0103620 A1* 4/2021 Singh ................ G06F 16/90348
2021/0141698 A1* 5/2021 Bourgeois ............. G06F 16/353
2021/0264056 A1* 8/2021 Irish .................... G06F 21/6245
2021/0303647 A1* 9/2021 Westmoreland ...... H04L 67/535
2021/0383405 A1* 12/2021 Mostyn ............... G06F 21/6245
2022/0019688 A1* 1/2022 Nelluri ................ G06F 21/6245
2022/0092219 A1* 3/2022 Evans ................ G06Q 20/4097
2022/0164472 A1* 5/2022 Cannon ............... G06F 21/6245
2022/0414165 A1* 12/2022 Robbins ................ G06F 16/908
2023/0038796 A1* 2/2023 Bhatkar .............. H04L 63/1433
2023/0092783 A1* 3/2023 Master Ben-Dor .......................... H04L 67/306
706/12
2023/0094856 A1* 3/2023 Ithal ...................... H04L 63/102
726/4
2023/0259979 A1* 8/2023 Mejia ................. G06Q 30/0269
705/14.51
2024/0430290 A1* 12/2024 Ithal ...................... H04L 63/205

* cited by examiner

FIG. 5B

USER PROFILE FILTERING BASED UPON SENSITIVE TOPICS

BACKGROUND

Many content providers maintain user profiles for users. When a user signs up for a news service, a social network service, a search engine, an email service, and/or a variety of other content providers or services, a user profile is generated for the user. A content provider can utilize the user profile to identify topics that are of interest to the user, such as where the user has an interest in running, sports cars, and swimming. The content provider may select content to provide to the user based upon the content corresponding to a topic of interest to the user, such as a review of a new sports car, a running blog to join, or a video about a recent Olympic swimming event. In this way, content that is interesting and/or relevant to the user is provided by the content provider to the user.

SUMMARY

In accordance with the present disclosure, one or more computing devices and/or methods for filtering user profiles based upon sensitive topics are provided. A set of candidate topics labeled with sensitivity labels corresponding to whether candidate topics are sensitive topics or non-sensitive topics are identified. In some embodiments, the set of candidate topics correspond to topics that have been labeled as sensitive topics (e.g., controversial topics, topics that could have privacy concerns, topics that could cause hurtful or negative feelings for viewers, topics could have security concerns, topics that could violate regulatory compliance policies related to what information about users is allowed to be tracked and maintained, etc.). In some embodiments, the set of candidate topics may be a relatively small set of topics (e.g., 200 or 300 manually labeled topics).

The sensitivity labels are applied to an unknown entity space of entities in order to label the entities with the sensitivity labels to create a set of labeled topics labeled as either the sensitive topics or the non-sensitive topics. In some embodiments, various content sources such as websites (e.g., an online encyclopedia website that can be added to by users at any time), social media networks, blogs, communication messages, etc., are crawled in order to identify entities that could potentially relate to topics that are sensitive or non-sensitive, and are thus referred to as unknown entities (e.g., a name of a new virus, an image or video of a new sporting activity, a video of a new dance, etc.). If an entity within the unknown entity space has similar characteristics as a sensitive topic, then the entity may be labeled with a sensitivity label indicating that the entity is a sensitive topic.

The set of labeled topics and metadata for the set of labeled topics (e.g., characteristics of the labeled topics) are stored within a central sensitivity data store. The set of labeled topics and metadata within the central sensitivity data store are used to filter sensitive topics from user profiles of users. In this way, the user profiles can be used to select and provide non-sensitive content to the users.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5B is a component block diagram illustrating an example system for filtering user profiles based upon sensitive topics, where a central sensitive data store is updated based upon a new set of unknown entities.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
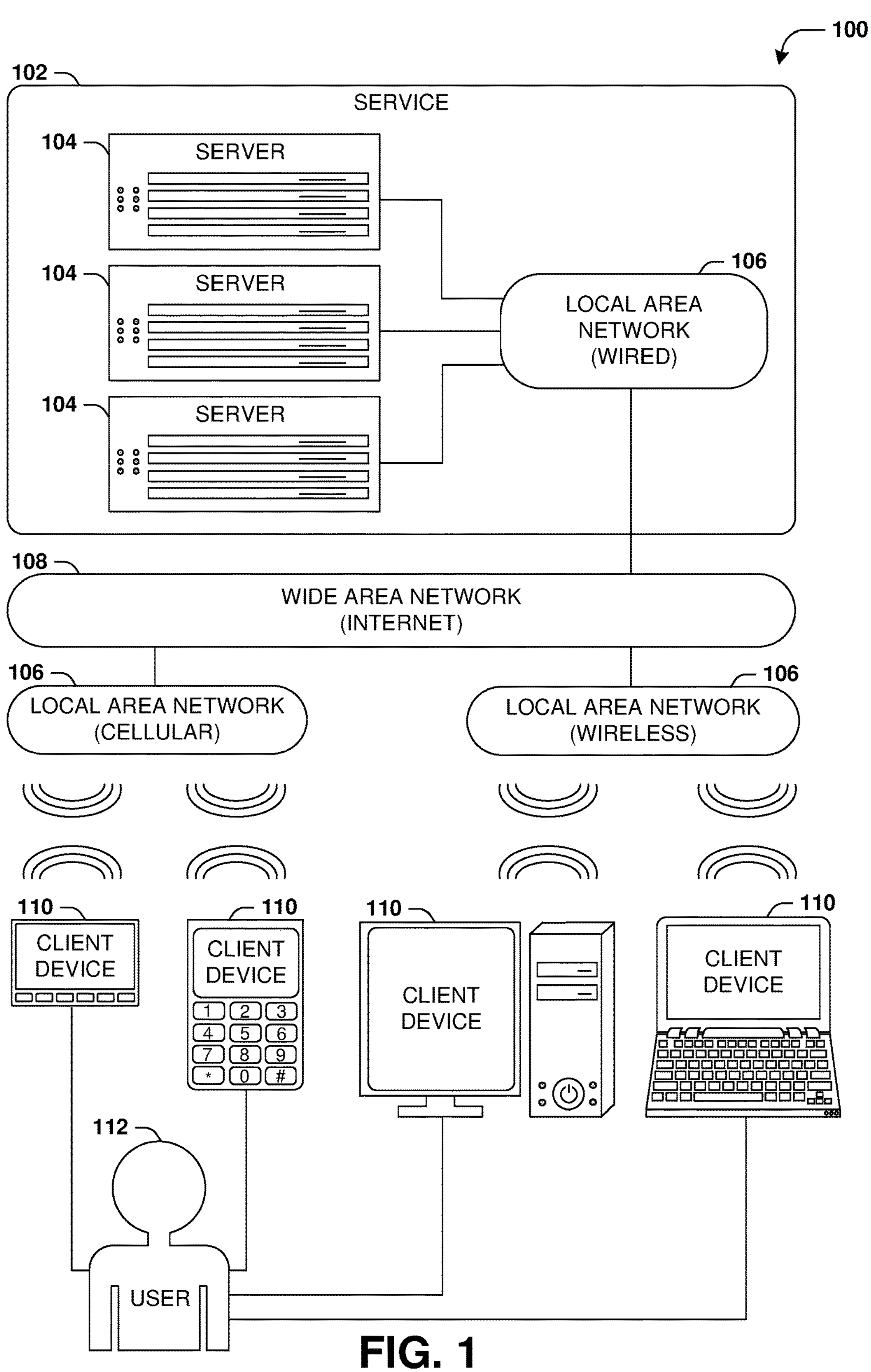
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figures 2, 3:
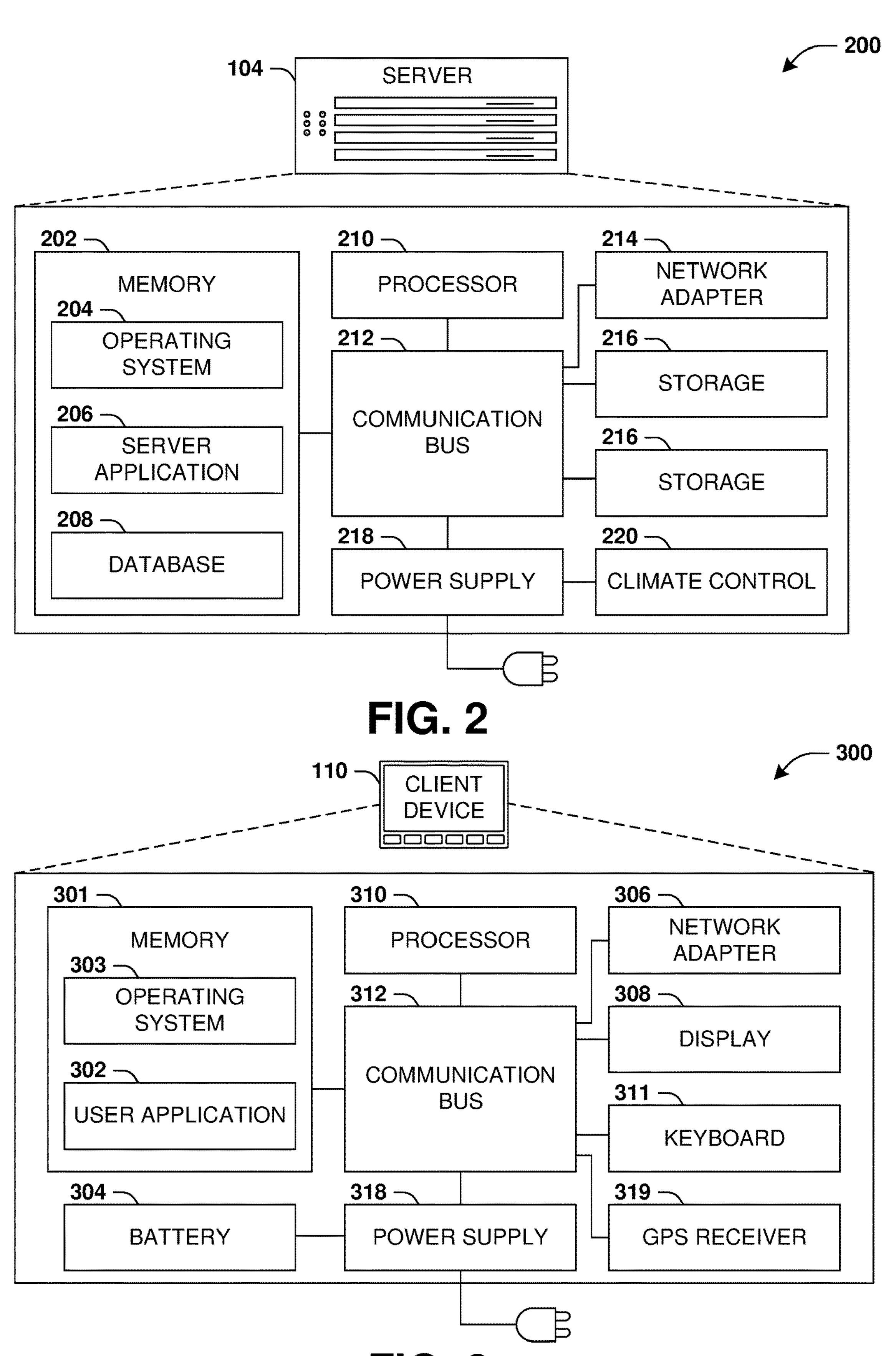
FIG. 2 is an illustration of a scenario involving an example configuration of a server that may utilize and/or implement at least a portion of the techniques presented herein.
FIG. 3 is an illustration of a scenario involving an example configuration of a client that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for filtering user profiles based upon sensitive topics are provided. Understanding user interests is a fundamental component of content personalization systems. User profiles are an integral part of a personalization system. A user profile is a collection of information associated with a user. The information about the user may include user-declared information that the user provided. The information about the user may include inferred interests that are statistically generated based on user behavior and tracking consent by the user. A content provider such as a personalization system generates different types of user interest profiles based on online activities of users. These user interest profiles are then leveraged for personalizing user recommendations and for determining what content to provide to users (e.g., videos, images, articles, blogs, and/or other content). One such user profile consists of canonical representations of topics and affinity scores of the topics. In some embodiments, a user interest profile may be based on article reading activity of the user. The interests are ordered by interest scores such as where the user mainly engages with sports and celebrity content articles.

In some embodiments, topics (user interest topics) are represented using categories from a taxonomy and canonical entity names from an online encyclopedia. The taxonomy may be a hierarchical content taxonomy. In some embodiments, the hierarchical content taxonomy consists of multiple levels of categories such as a 5 level hierarchy with over 1205 categories. A first level of the hierarchical content taxonomy may comprises a particular number of categories (e.g., 21 categories) that cover broad-level topics such as sports, finance, weather, news, shopping, money, politics, etc. The online encyclopedia may be a multilingual online encyclopedia (e.g., available in hundreds of languages) that is written and maintained by a community of users (e.g., volunteer users) through open collaboration and an editing system.

The online encyclopedia consists of millions of articles (e.g., over 6 million articles) and millions of users (e.g., over 44 million users). Each encyclopedia page provides a comprehensive description of a single topic/entity. A personalization system of a content provider utilizes these topics and uses article link suffixes as canonical entity names. For example, 'https://en.example_online_encyclopedia.org/article/George_Washington' page provides details about former US president George Washington. 'George_Washington entity name is derived based on the suffix of this link and is used for personalization.

Online tracking of user data and interests has become regulated by many jurisdictions and governing authorities. These regulations, such as regulatory compliance policies, may vary depending on the region and target use of user data and interests. For example, different regulations are applicable for regulating user data in the United States versus European regions, and different regulations are applicable for different use cases such as providing recommendations, content personalization, email marketing, social network feed information, searching engine utilization, etc. A general data protection regulation (GDPR) defines personal data as any information relating to an identified or identifiable natural person. There are two categories of personal data: ordinary personal data and sensitive personal data. The GDPR defines sensitive personal data as any data revealing racial or ethnic origin, religious beliefs, mental or physical health, sexual orientation, or genetic or biometric data.

A content personalization system takes sensitive topics into consideration when selecting and providing content to users. Content about these sensitive topics can still be displayed to users, however, such content may be restricted to not being personalized based on the user's previous activity. For example, a sensitive topic article can be recommended to users based on the article's popularity or trendiness, however, this recommendation should not be based on the user's previous activity nor should the user's engagement with such content be tracked and used for future recommendations for that user.

When users engage with online content of a website (e.g., a homepage website for accessing news, email, videos, etc.), this activity is used to derive user interest information. For example, if a user reads finance articles frequently, these articles get mapped to taxonomy categories and online encyclopedia entities, and that user's profile will consist of higher affinity scores for finance-related topics.

Depending on the types of articles read by users, a certain subset of such activity might lead to a collection of sensitive information about that user. For example, if a user often reads articles related to a specific religion or a specific disease, user profile data of the data will consist of this sensitive information. Since the collection of such sensitive data is regulated, there arises a need for a system that can identify and exclude sensitive topics from user profiles.

A manual approach can be used to label sensitive topics. However, a manual approach cannot be scaled to handle cases where sensitive topics can have a large number of representations (e.g., 6.5 million entities represented by an online encyclopedia).

Accordingly, as provided herein, a scalable system for filtering user profiles based upon sensitive topics is provided for addressing these problems. The scalable system leverages an editorially annotated dataset (a set of candidate topics) to automatically label entities (e.g., entities extracted from articles of an online encyclopedia or entities extracted from other content sources such as websites, blogs, articles, social media feeds, etc.) for sensitivity. The scalable system supports various taxonomies, regions (geographical regions), jurisdictions, languages, etc. Such regions and jurisdictions could have differing regulatory compliance polices (laws) and customs that can affect whether a topic is sensitive or non-sensitive, which is taken into account by the scalable system.

The scalable system is configured for the identification and exclusion of sensitive topics from user profiles such as for the purpose of personalization. This eases the scalability and time sensitivity challenges by centralizing common sensitivity labeling processes for cross-functional groups (e.g., a marketing group, a new website hosting group, an email group, a content recommendation group, a content personalization group, a regulatory compliance/legal group, etc.), allowing various domain experts to utilize common patterns that aid in maintaining and speeding along compliance with regulatory compliance policies, and having a single touch point for users (e.g., a legal team) to track various groups' progress with respect to complying with pertinent regulatory compliance policies.

The scalable system is used to ensure compliance with regulations (regulatory compliance policies) relating to how user interests are tracked for personalization. These regulations introduce rules around age, gender, topics, and other dimensions that must be followed, which makes the compliance landscape increasingly complex as more jurisdictions introduce divergent privacy laws, or where existing laws become more defined with precedents (legal precedents).

Most organizations manage compliance using processes defined by a legal team for various cross-functional partners to follow. For instance, a legal team would aid in the classification of sensitive topics for marketing and content recommendation groups where taxonomies can differ per domain. Sensitive topics can be identified and labeled manually, however, it is expensive to scale, especially in cases where the number of topics is significantly large and dynamic. Instead, the scalable system is provided for identifying and excluding sensitive topics from user profiles, which can be scaled up to support multiple regions, taxonomies, and use cases.

On one hand, businesses providing user-centric services are becoming increasingly reliant on personalization and targeting capabilities. Understanding users and interests of users is now an integral part of these user-centric services. On the other hand, data governance requirements (regulatory compliance polices) are becoming increasingly fragmented as countries, states, and cities adopt different laws and regulations. This increase in complexity results in legal risk and engineering overhead for individual teams to constantly keep different systems compliant. This scalable system is able to scale and solve the problems of ensuring regulatory compliance for entire organizations.

In some embodiments, the scalable system (e.g., system 500 of FIGS. 5A-5D, system 600 of FIG. 6, etc.) includes various components, such as a sensitive labels database, a crawler and text cleaner, a content analysis platform (e.g., a classification web service), a sensitivity label mapper, and a user profile updater.

The sensitive labels database may be implemented as a central sensitivity data store that stores sensitive topics, sensitivity labels, and metadata. The metadata includes additional information about the sensitivity of data and how to apply such information (e.g., applicable geographic regions for certain sensitive topics, target use cases such as marketing emails, recommendations, personalization of content, etc., dataset generation dates, and/or other information specific to the sensitivity level of the data). In some embodiments, a list of sensitive topics that are applicable to a particular region (e.g., US regions) and particular use cases (e.g., personalization of content) may be provided (e.g., by a legal team) as a dataset (a set of candidate topics labeled with sensitivity labels). The dataset may be used to annotate categories with sensitivity labels for sensitivity. These <category, sensitivity label> annotations along with metadata (e.g., a dataset generation date, a region such as a US region, a language such as English, an entity type such as category, a use case such as content personalization, etc.) are stored (e.g., as candidate topics) for subsequently annotating unknown entities with sensitivity labels. Sensitive topic datasets for other regions, languages, and/or use cases may also be stored with the sensitive labels database as sets of candidate topics.

The crawler and text cleaner may be implemented as a pipeline that crawls content sources (e.g., an online encyclopedia) on a periodic basis. The pipeline is used to collect entity pages (e.g., entity pages/articles of the online encyclopedia) that are cleaned to remove redundant text and to add tags with corresponding categories.

The content analysis platform is configured to classify text by topic and quality. The content analysis platform includes multiple machine learning models for classifying an input text into one or more categories. The machine learning models may include support vector machine (SVM) classifier models, bidirectional encoder representations from transformers (BERT) classifier models, etc.

The pipeline obtains entity pages (e.g., entity pages/articles of the online encyclopedia) on a periodic basis, which may be stored in shards that are tagged to create <entity page, category> used by the sensitivity label mapper. Entity pages with a small amount of text (e.g., less than a threshold amount of words) and/or entity pages that are disambiguation pages (e.g., a page that could relate to two different cites with the same same) are not tagged.

The sensitivity label mapper consumes the tagged data, and joins the tagged data with sensitivity labels. Each pair of <entity page, category> (a set of unknown entities) gets joined with <category, sensitivity label> data (a set of candidate topics labeled with sensitivity labels), which is converted into <entity page, sensitivity label> data (a set of labeled topics). The set of labeled topics and corresponding metadata (e.g., generation date, region, language, entity type, use case, etc.) is stored within the central sensitivity data store.

The user profile updater uses the <entity page, sensitivity label> data (a set of labeled topics) and the editorially annotated <category, sensitivity label> (a set of candidate topics labeled with sensitivity labels) to remove sensitivity categories and entities from user profiles. The updated user profiles are used to provide personalized recommendations to users.

The scalable system and components therein are designed to be scaled up to support additional regions (geographical regions), languages, applications (use cases such as marketing, providing personalized content, providing recommendations, etc.), taxonomies, entity types, etc.

Figure 4:
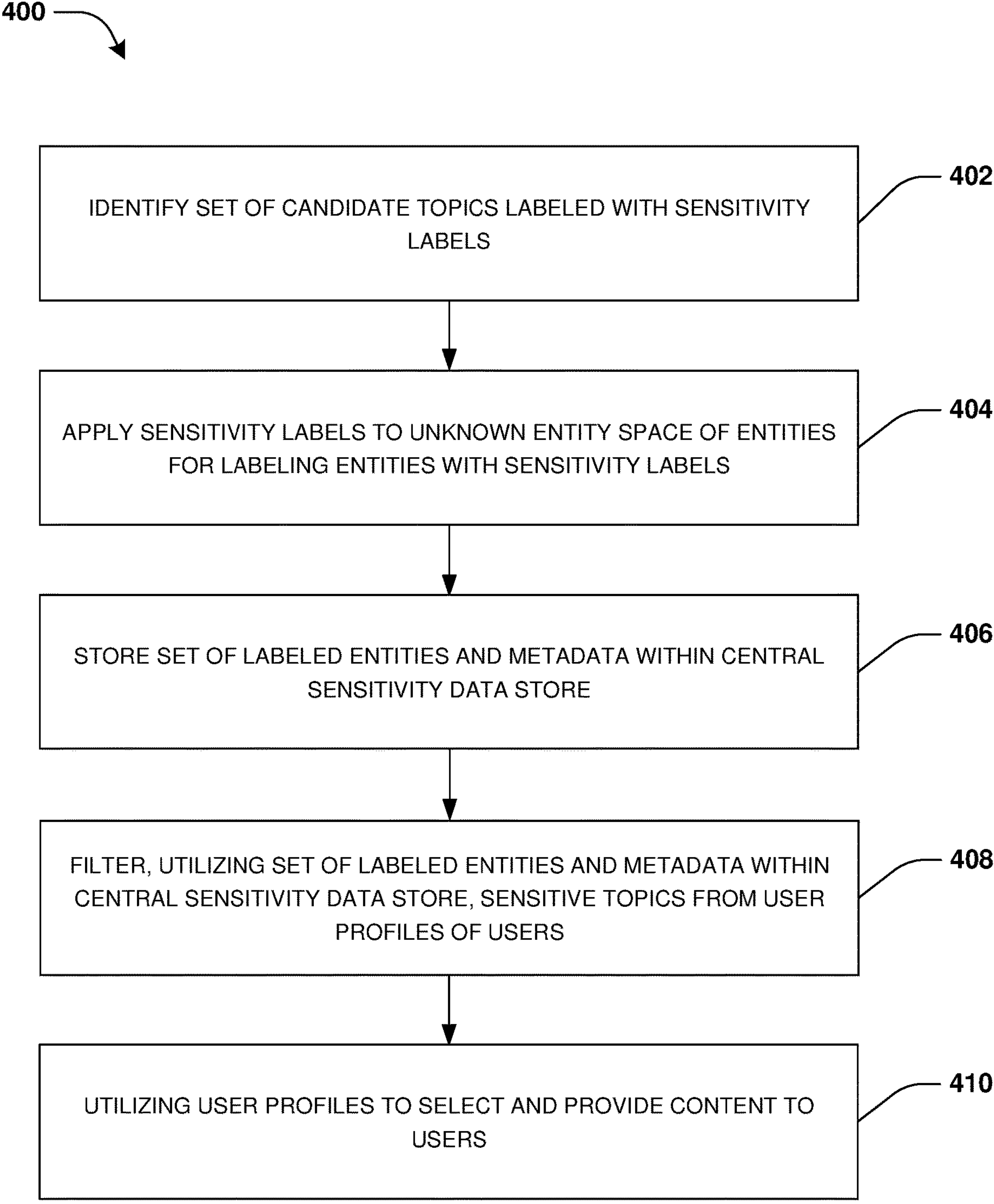
FIG. 4 is a flow chart illustrating an example method for filtering user profiles based upon sensitive topics.
Figure 5A:
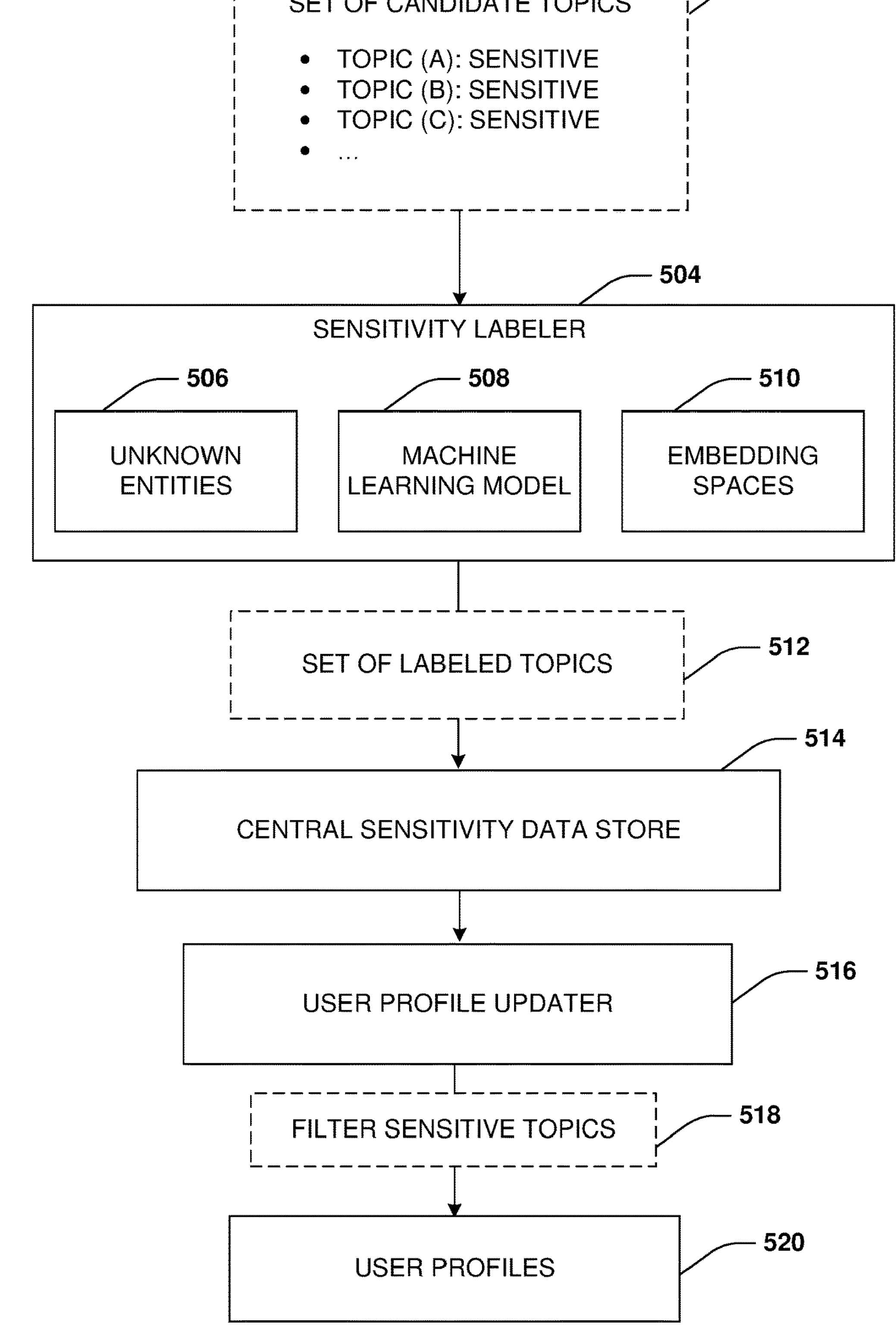
FIG. 5A is a component block diagram illustrating an example system for filtering user profiles based upon sensitive topics.

One embodiment of filtering user profiles based upon sensitive topics is illustrated by an exemplary method 400 of FIG. 4 and is further described in conjunction with system 500 of FIGS. 5A-5D and FIG. 6. The system 500 may be implemented as a scalable system that includes a sensitivity labeler 504 (a sensitivity label mapper) configured to label entities with sensitivity labels for inclusion within a centralized sensitivity data store 514. The sensitivity labeler 504 may take a set of candidate topics 502 as input, as illustrated by FIG. 5A. In particular, during operation 402 of method 400, the set of candidate topics 502 is identified as including candidate topics that are labeled with sensitivity labels corresponding to whether the candidate topics are sensitive topics or non-sensitive topics. In some embodiments, the set of candidate topics 502 are manually labeled with the sensitivity labels to indicate that the candidate topics are sensitive topics. In some embodiments, the sensitive topics are defined by a regulatory compliancy policy, and may be based upon other information such as jurisdictional information (e.g., enforcement and/or precedent of how regulatory laws have been applied), a region where a user is located, customs of where the user is located (e.g., certain topics may be sensitive to certain cultures, but are not sensitive to other cultures), etc.

The sensitivity labeler 504 may implement a machine learning model 508 and/or embedding spaces 510 that utilize the set of candidate topics 502 for assigning sensitivity labels to unknown entities 506. The unknown entities 506 may relate to text, images, videos, audio, and/or other information extracted from websites, articles, online encyclopedia articles/pages, social network posts, or any other types of content. During operation 404 of method 400, the sensitivity labels of the set of candidate topics 502 are applied the unknown entities 506 within an unknown entity space in order to label the unknown entities 506 with sensitivity labels to create a set of labeled topics labeled as either sensitive topics or non-sensitive topics. In some embodiments, canonical entity and topic representations are used to resolve ambiguity of whether a topic is a sensitive topic or a non-sensitive topic.

In some embodiments of assigning sensitivity labels to the unknown entities 506, the machine learning model 508 is used to identify characteristics of the candidate topics that led to the candidate topics being labeled as sensitive topics, and then compare those characteristics to characteristics of the unknown entities 506 in identify similarities for determining whether any of the unknown entities 506 are sensitive topics. In some embodiments, the embedding spaces 510 such as semantic embedding spaces are used for classifying the unknown entities 506 as sensitive topics or non-sensitive topics. The candidate topics 502 and the unknown entities 506 are projected to a semantic embedding space. If an unknown entity is within a threshold distance in the semantic embedding space to a sensitive topic, then the unknown entity may be labeled with a sensitivity label indicating that the unknown entity is a sensitive topic. Otherwise, the unknown entity is labeled as a non-sensitive topic.

During operation 406 of method 400, the set of labeled topics 512 (e.g., unknown entities labeled as sensitive topics) and metadata for the set of labeled topics 512 (e.g., other entities or other content occurring within an article about an unknown entity; a jurisdiction or region where the classification should be applicable; what information and/or candidate topics that led to the unknown entity being classified as a sensitive topic, etc.) is stored within the central sensitivity data store 514. In this way, the central sensitivity data store 514 is a central location for various users (e.g., a legal department) and/or content providers (e.g., a personalization system, a marketing system, a recommendation system, etc.) to identify the latest sensitive topics.

During operation 408 of method 400, a user profile updater 516 utilizes the set of labeled topics and the metadata (and other previously labeled topics and information) within the central sensitivity data store 514 to filter 518 sensitive topics from user profiles 520. In this way, the user profile updater 516 utilizes the latest sensitive topics for filtering user profile data from the user profiles 520 in order to comply with relevant regulatory compliance policies.

Figure 5B:
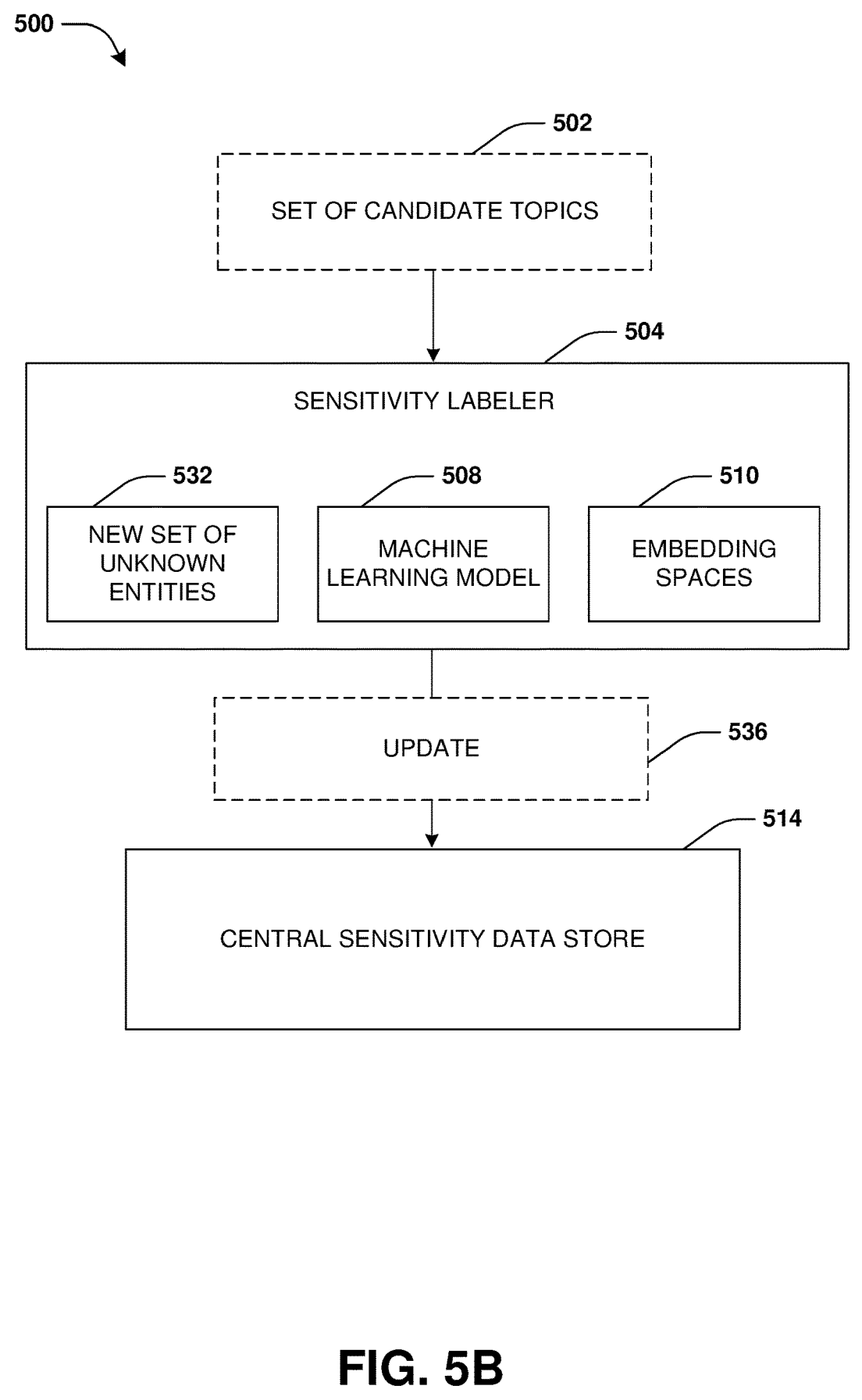

New sets of unknown entities, such as a new set of unknown entities 532, may be periodically identified for updating 536 the central sensitivity data store 514, as illustrated by FIG. 5B. For example, various content sources such as an online encyclopedia are periodically crawled to identify new unknown entities to classify and label as either being sensitive topics or non-sensitive topics for updating the central sensitivity data store 514. In response to the central sensitivity data store 514 being updated 536 with new sensitive topics, a subsequent filtering operation is performed to filter the new sensitive topics from the user profiles.

Figure 5C:
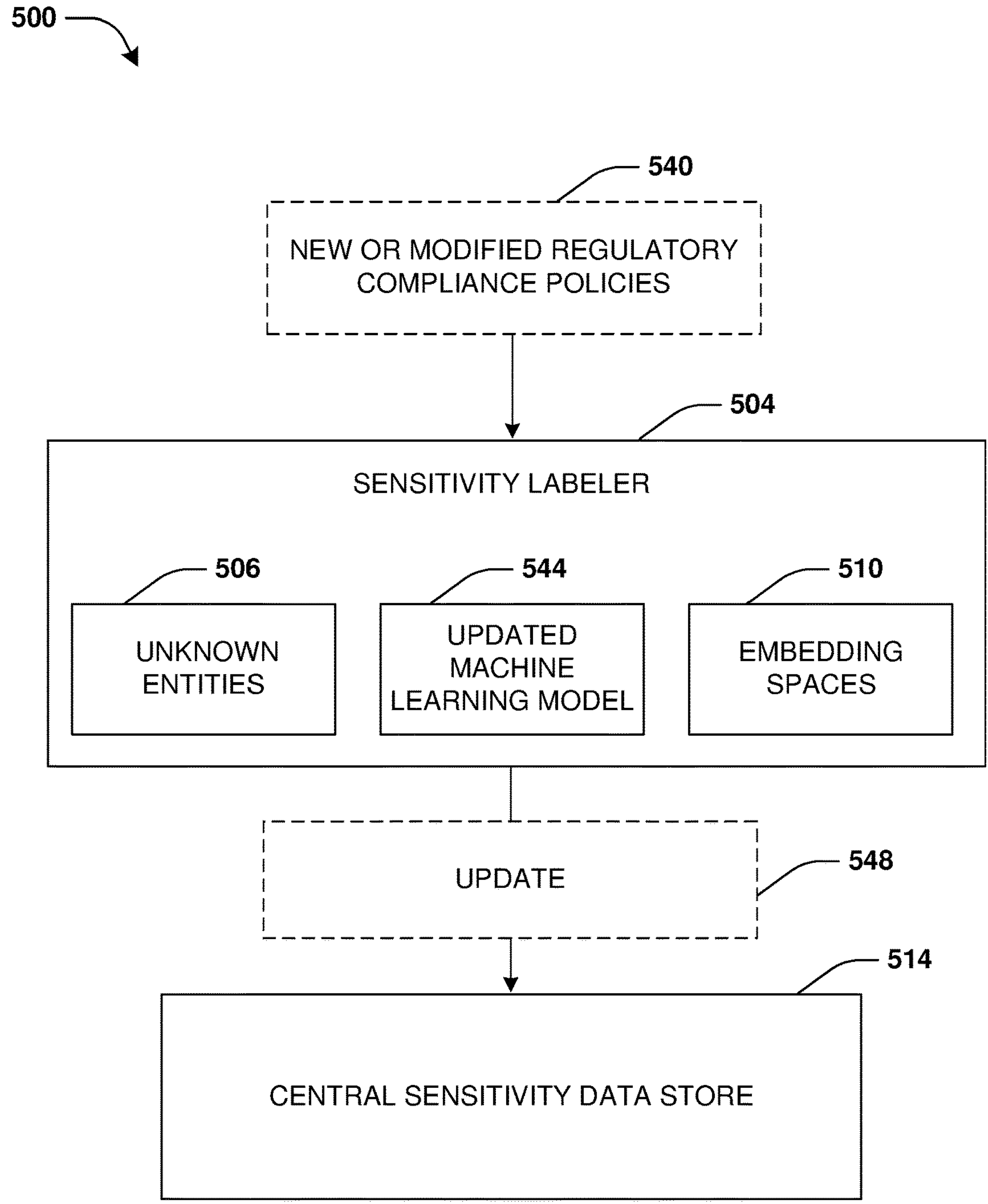
FIG. 5C is a component block diagram illustrating an example system for filtering user profiles based upon sensitive topics, where a central sensitive data store is updated based upon a new or modified regulatory compliance policy.

New and/or modified regulatory compliance policies 540 may be identified by the scalable system, as illustrated by FIG. 5C. The sensitivity labeler 504 utilizes the new and/or modified regulatory compliance policies 540 to update the machine learning model 544 to take into account any new constraints, criteria, laws, and/or information within the new and/or modified regulatory compliance policies 540 that could affect what is and is not a sensitive topic. In this way, sensitivity labels within the central sensitivity data store 514 may be updated 548 based upon the new information, and user profiles may be filtered based upon the updates to the central sensitivity data store 514 in order to take into account any regulatory changes regarding what information can be tracked and used in user profiles.

Figure 5D:
FIG. 5D is a component block diagram illustrating an example system for filtering user profiles based upon sensitive topics, where content corresponding to a non-sensitive topic is selected and provided to a user.
Figure 5D:
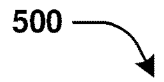
Figure 5D:
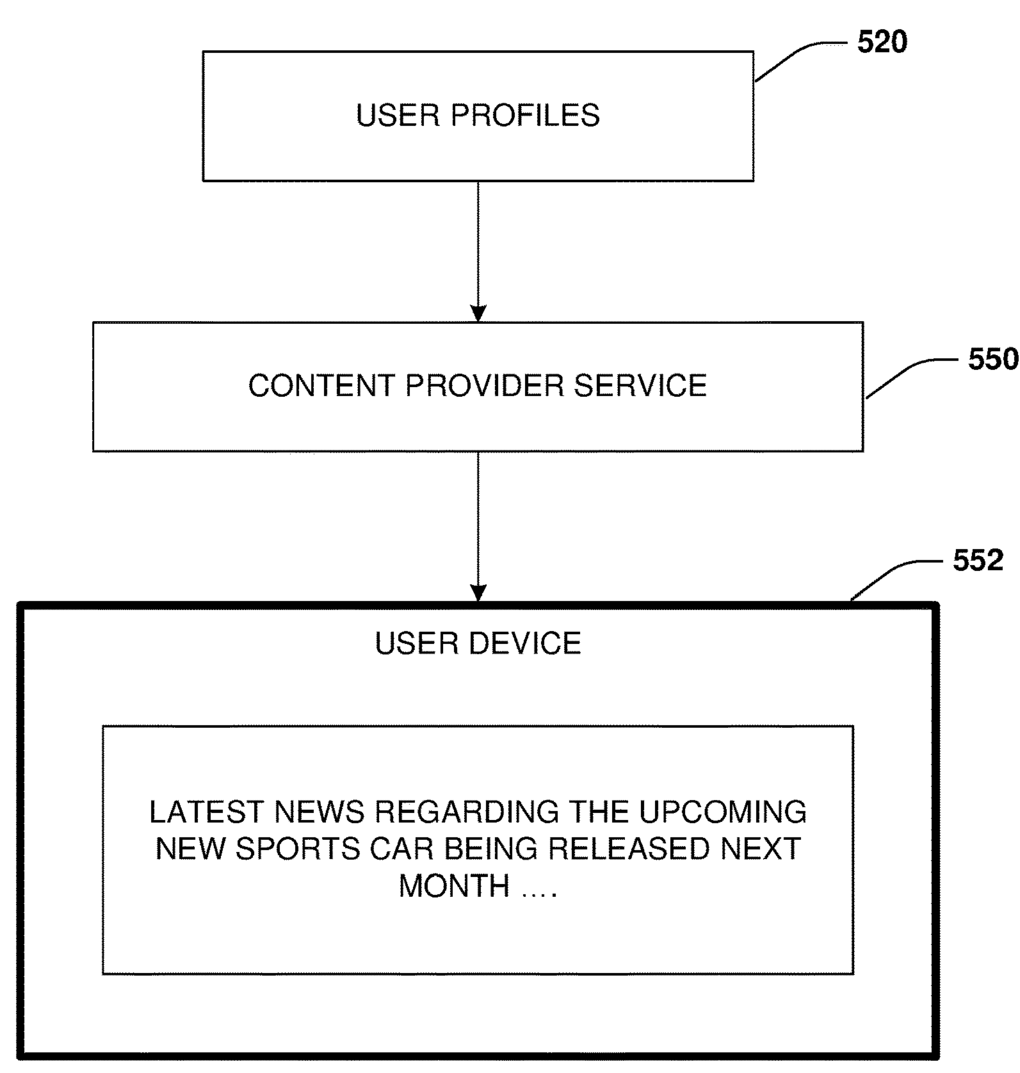

During operation 410 of method 400, the user profiles 520 are utilized by a content provider service 550 or other services in order to select and provide content to users, as illustrated by FIG. 5D. For example, the content provider service 550 may utilize a user profile for a user of a user device 552 in order to select content that corresponds to a non-sensitive topic since sensitive topics have been filtered from the user profile. In this way, the content provider service 550 transmit the content to the user device 552 for display.

In some embodiments of providing content items that are related to non-sensitive topics to users, a set of content items available to provide to the user are identified (e.g., images, articles, text, videos, audio, etc.). The set of content items are filtered to exclude content items corresponding to sensitive topics maintained within the central sensitivity data store 514. In this way, a content item, corresponding to a non-sensitive topic, is selected from the filtered set of content items and is provided to user device 552 for display.

Figure 6:
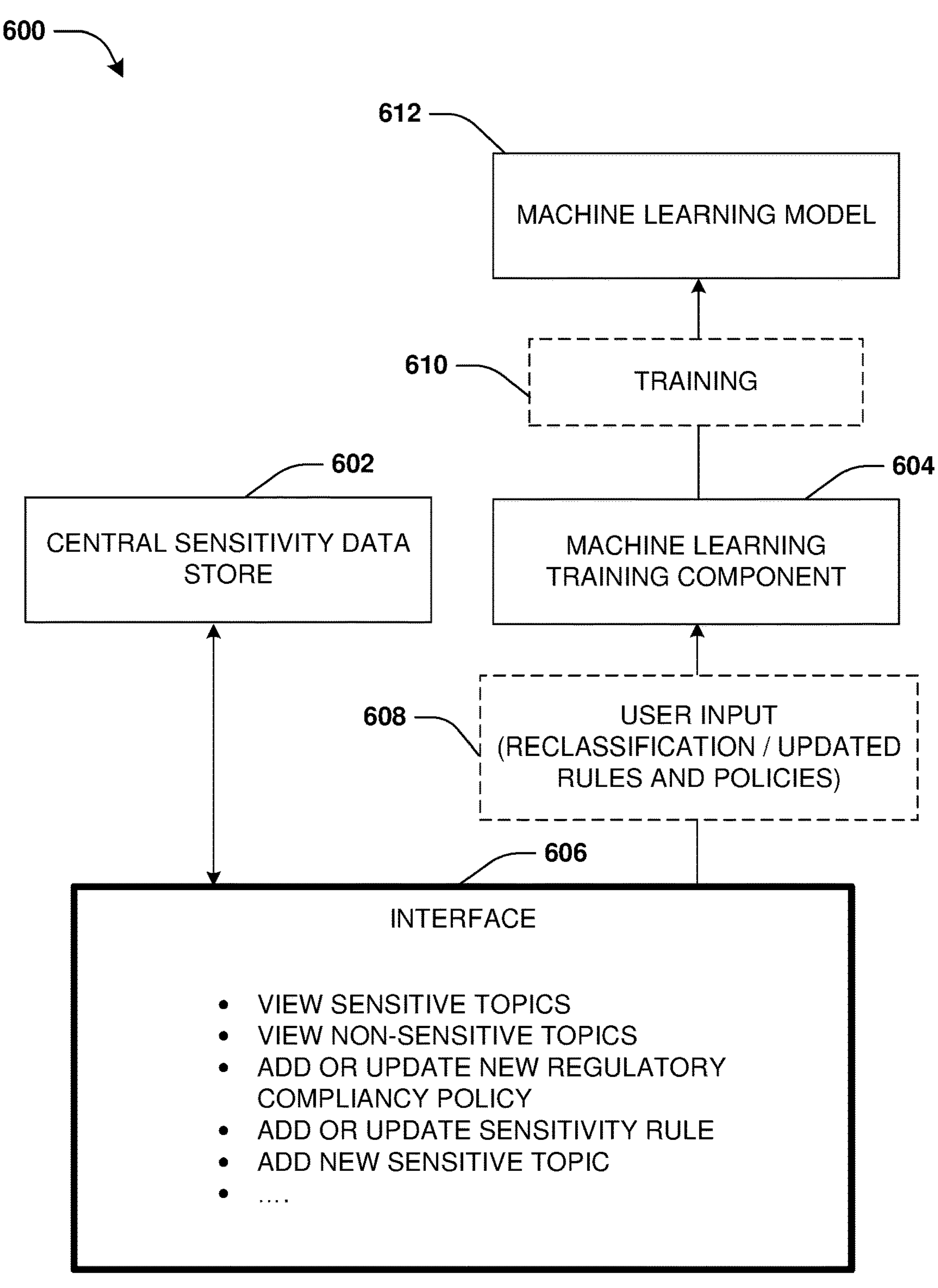
FIG. 6 is a component block diagram illustrating an example system for filtering user profiles based upon sensitive topics, where access is provided to a central sensitive data store through an interface.

FIG. 6 illustrates a system 600 including an interface 606 that provides users with access to a central sensitivity data store 602. A user (e.g., a legal department member in charge of regulatory compliance) may access the interface 606 in order to view sensitive topics and/or non-sensitive topics for editing, add or update new regulatory compliance policies that are taken into consideration when identifying sensitive topics, add or update sensitivity rules for determining what constitutes a sensitive topic, manually add or remove a sensitive topic, etc. User input 608, such as a user reclassifying a sensitive topic as a non-sensitive topic or vice-versa, may be used by a machine learning training component 604 to train 610 a machine learning model 612 used to classify unknown entities by labeling the unknown entities with sensitivity labels. Weights and/or classification processes implemented by the machine learning model 612 may be modified based upon the user input 608 (e.g., the user reclassifying a non-sensitive topic as a sensitivity topic, a new regulatory compliance policy, a change to an existing regulatory compliance policy, a jurisdiction of a user, a compliance law of where a user is located, etc.). In this way, the accuracy of identifying sensitive topics is improved based upon user input 608 may provide feedback and/or new information to take into consideration when classifying topics are sensitivity or non-sensitive topics.

Figure 7:
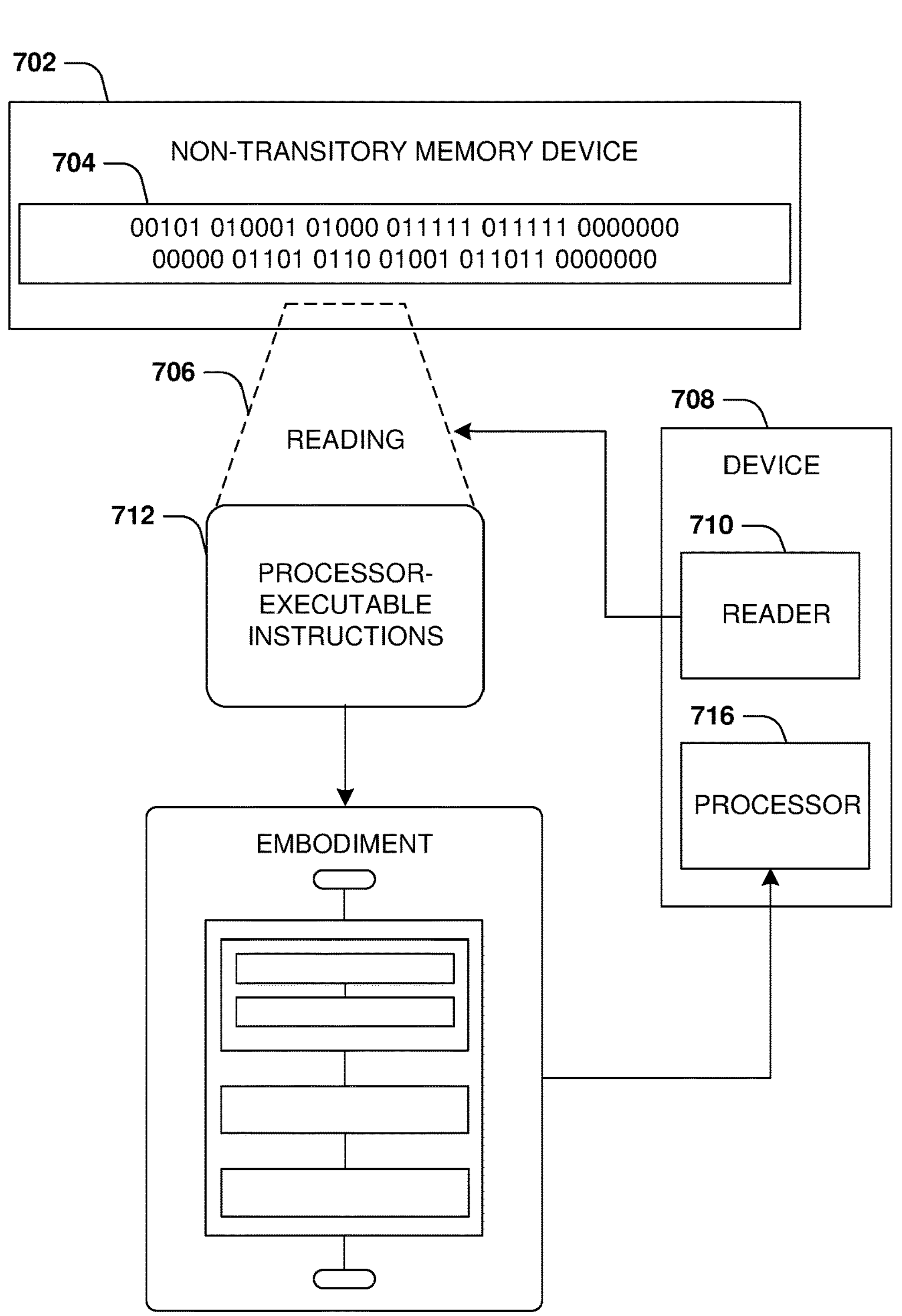
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 400 of FIG. 4, for example. In some embodiments, the processor-executable instructions 712 are configured to cause implementation of a system, such as at least some of the example system 500 of FIGS. 5A-5D and/or at least some of the example system 600 of FIG. 6, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In some embodiments, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description.

Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method executing on a processor of a computing device that causes the computing device to perform operations comprising:

identifying a set of candidate topics labeled with sensitivity labels corresponding to whether candidate topics are sensitive topics or non-sensitive topics;

applying the sensitivity labels to an unknown entity space of entities to label the entities with the sensitivity labels to create a set of labeled topics labeled as either the sensitive topics or the non-sensitive topics, wherein the applying comprises:

crawling a plurality of remote content sources to identify a first unknown entity of the entities and a second unknown entity of the entities, wherein the crawling is performed using a crawler configured to retrieve one or more pages and provide the one or more pages to a text cleaner configured to at least one of remove redundant text or add one or more tags;

labeling the first unknown entity with a sensitivity label based upon a determination that the first unknown entity has one or more similar characteristics as a sensitive topic; and labeling the second unknown entity with a non-sensitivity label based upon a determination that the second unknown entity does not have one or more similar characteristics as a sensitive topic, wherein at least one of the determination that the first unknown entity has one or more similar characteristics as a sensitive topic or the determination that the second unknown entity does not have one or more similar characteristics as a sensitive topic is performed by one or more machine learning models configured to (i) project one or more entities into a semantic embedding space and (ii) compare one or more embedding distances between the one or more entities and one or more candidate topics;

storing the set of labeled topics and metadata for the set of labeled topics within a central sensitivity data store configured to store one or more sensitivity mappings and associated metadata;

detecting a modification to a regulatory compliance policy;

updating the central sensitivity data store based upon the modification to the regulatory compliance policy by reclassifying one or more entities within the central sensitivity data store with one or more updated sensitivity labels based upon the modification to the regulatory compliance policy;

filtering, utilizing a user profile updater configured to retrieve the set of labeled topics determined by crawling the plurality of remote content sources and the metadata within the central sensitivity data store, user profiles of users of a first geographical region to exclude content corresponding to sensitive topics without excluding at least some other content from the user profiles in compliance with a first regulatory compliance policy associated with what information about users is allowed to be tracked in the first geographical region; and filtering, utilizing a user profile updater configured to retrieve a second set of labeled topics determined by crawling the plurality of remote content sources and second metadata, user profiles of users of a second geographical region to exclude content corresponding to second sensitive topics without excluding at least some other content from the user profiles in compliance with a second regulatory compliance policy associated with what information about users is allowed to be tracked in the second geographical region.

2. The method of claim 1, wherein:

the plurality of remote content sources are from an online encyclopedia website.

3. The method of claim 1, wherein comprising:

the regulatory compliance policy subjected to the modification is the first regulatory compliance policy associated with what information about users is allowed to be tracked in the first geographical region.

4. The method of claim 1, comprising:

periodically generating new unknown entity spaces of new entities to classify with sensitivity labels for updating the central sensitivity data store with a new sensitive topic; and in response to updating the central sensitivity data store, performing a subsequent filtering operation to filter the new sensitive topic from the user profiles.

5. The method of claim 1, comprising:

crawling one or more content sources to identify at least one of the entities.

6. The method of claim 1, comprising:

identifying a set of content items available to provide to a user;

filtering the set of content items to exclude content items corresponding to the sensitive topics to create a filtered set of content items; and providing a content item selected from the filtered set of content items to a computing device for display to the user.

7. The method of claim 1, comprising:

crawling one or more content sources to identify one or more entities;

updating the central sensitivity data store based upon the one or more entities; and filtering one or more new sensitive topics from one or more user profiles utilizing the central sensitivity data store.

8. The method of claim 1, comprising:

providing a user with access to the central sensitivity data store through an interface; and populating the interface with a list of sensitive topics for review and editing.

9. The method of claim 8, comprising:

in response to receiving, through the interface, user input indicating that a sensitive topic within the list of sensitive topics is a non-sensitive topic, reclassifying the sensitive topic as the non-sensitive topic.

10. A non-transitory machine-readable medium having stored thereon processor-executable instructions that when executed cause performance of operations, the operations comprising:

identifying a set of candidate topics labeled with sensitivity labels corresponding to whether candidate topics are sensitive topics or non-sensitive topics;

applying the sensitivity labels to an unknown entity space of entities to label the entities with the sensitivity labels to create a set of labeled topics labeled as either the sensitive topics or the non-sensitive topics, wherein the applying comprises:

crawling a plurality of remote content sources to identify a first unknown entity of the entities and a second unknown entity of the entities, wherein the crawling is performed using a crawler configured to retrieve one or more pages and provide the one or more pages to a text cleaner configured to at least one of remove redundant text or add one or more tags;

labeling the first unknown entity with a sensitivity label based upon a determination that the first unknown entity has one or more similar characteristics as a sensitive topic; and labeling the second unknown entity with a non-sensitivity label based upon a determination that the second unknown entity does not have one or more similar characteristics as a sensitive topic, wherein at least one of the determination that the first unknown entity has one or more similar characteristics as a sensitive topic or the determination that the second unknown entity does not have one or more similar characteristics as a sensitive topic is performed by one or more machine learning models configured to (i) project one or more entities into a semantic embedding space and (ii) compare one or more embedding distances between the one or more entities and one or more candidate topics;

storing the set of labeled topics and metadata for the set of labeled topics within a central sensitivity data store configured to store one or more sensitivity mappings and associated metadata;

detecting a modification to a regulatory compliance policy;

updating the central sensitivity data store based upon the modification to the regulatory compliance policy by reclassifying one or more entities within the central sensitivity data store with one or more updated sensitivity labels based upon the modification to the regulatory compliance policy;

filtering, utilizing a user profile updater configured to retrieve the set of labeled topics determined by crawling the plurality of remote content sources and the metadata within the central sensitivity data store, user profiles of users of a first geographical region to exclude content corresponding to sensitive topics without excluding at least some other content in compliance with a first regulatory compliance policy associated with what information about users is allowed to be tracked in the first geographical region;

filtering, utilizing a user profile updater configured to retrieve a second set of labeled topics determined by crawling the plurality of remote content sources and second metadata, user profiles of users of a second geographical region to exclude content corresponding to second sensitive topics without excluding at least some other content in compliance with a second regulatory compliance policy associated with what information about users is allowed to be tracked in the second geographical region; and utilizing a user profile to select content corresponding to a non-sensitive topic to display on a display of a computing device.

11. The non-transitory machine-readable medium of claim 10, comprising:

providing a user with access to the central sensitivity data store through an interface; and populating the interface with at least one of a list of non-sensitive topics or a list of sensitive topics.

12. The non-transitory machine-readable medium of claim 11, comprising:

in response to receiving, through the interface, user input indicating that a non-sensitive topic within the list of non-sensitive topics is a sensitive topic, reclassifying the non-sensitive topic as the sensitive topic.

13. The non-transitory machine-readable medium of claim 10, comprising:

in response to receiving user input indicating that a non-sensitive topic within the central sensitivity data store is a sensitive topic, reclassifying the non-sensitive topic as the sensitive topic; and modifying, based upon the reclassification, a weight or a classification process used by machine learning functionality to label entities with sensitivity labels.

14. The non-transitory machine-readable medium of claim 10, comprising:

in response to receiving user input indicating that a sensitive topic within the central sensitivity data store is a non-sensitive topic, reclassifying the sensitive topic as the non-sensitive topic; and modifying, based upon the reclassification, a weight or a classification process used by machine learning functionality to label entities with sensitivity labels.

15. The non-transitory machine-readable medium of claim 10, comprising:

identifying a compliance domain for a location of a user having a user profile within the central sensitivity data store; and modifying a weight or a classification process used by machine learning functionality to label entities with sensitivity labels for filtering the user profile of the user based upon the compliance domain.

16. A computing device comprising:

a processor; and memory comprising processor-executable instructions that when executed by the processor cause performance of operations, the operations comprising:

identifying a set of candidate topics labeled with sensitivity labels corresponding to whether candidate topics are sensitive topics or non-sensitive topics;

applying sensitivity labels to an unknown entity space of entities to label the entities with the sensitivity labels to create a set of labeled topics labeled as either sensitive topics or non-sensitive topics, wherein the applying comprises:

crawling a plurality of remote content sources to identify a first unknown entity of the entities and a second unknown entity of the entities, wherein the crawling is performed using a crawler configured to retrieve one or more pages and provide the one or more pages to a text cleaner configured to at least one of remove redundant text or add one or more tags;

labeling the first unknown entity with a sensitivity label based upon a determination that the first unknown entity has one or more similar characteristics as a sensitive topic; and labeling the second unknown entity with a non-sensitivity label based upon a determination that the second unknown entity does not have one or more similar characteristics as a sensitive topic, wherein at least one of the determination that the first unknown entity has one or more similar characteristics as a sensitive topic or the determination that the second unknown entity does not have one or more similar characteristics as a sensitive topic is performed by one or more machine learning models configured to (i) project one or more entities into a semantic embedding space and (ii) compare one or more embedding distances between the one or more entities and one or more candidate topics;

storing the set of labeled topics and metadata for the set of labeled topics within a central sensitivity data store configured to store one or more sensitivity mappings and associated metadata;

detecting a modification to a regulatory compliance policy;

updating the central sensitivity data store based upon the modification to the regulatory compliance policy by reclassifying one or more entities within the central sensitivity data store with one or more updated sensitivity labels based upon the modification to the regulatory compliance policy;

filtering, utilizing a user profile updater configured to retrieve the set of labeled topics and the metadata within the central sensitivity data store, user profiles of users of a first geographical region to exclude sensitive topics from the user profiles in compliance with a first regulatory compliance policy associated with what information about users is allowed to be tracked in the first geographical region;

filtering, utilizing a user profile updater configured to retrieve a second set of labeled topics and second metadata, user profiles of users to exclude sensitive topics from user profiles of a second geographical region in compliance with a second regulatory compliance policy associated with what information about users is allowed to be tracked in the second geographical region; and utilizing a user profile to select content corresponding to a non-sensitive topic to display on a display of a computing device.

17. The computing device of claim 16, wherein the operations comprise:

in response to an entity being within a threshold distance of a non-sensitive topic within the semantic embedding space, labeling the entity as the non-sensitive topic.

18. The computing device of claim 16, wherein the operations comprise:

in response to an entity being within a threshold distance of a sensitive topic within the semantic embedding space, labeling the entity as the sensitive topic.

19. The computing device of claim 16, wherein modifying a weight or a classification process used by machine learning functionality to label entities with sensitivity labels for filtering a user profile of a user based upon a jurisdiction of where the user is located.

20. The computing device of claim 16, wherein modifying a weight or a classification process used by machine learning functionality to label entities with sensitivity labels for filtering a user profile of a user based upon a compliance law of where the user is located.

* * * * *